United States Patent [19]

Lambert

[11] Patent Number: 5,642,380
[45] Date of Patent: Jun. 24, 1997

[54] DATA COMMUNICATION SYSTEM AND MODEM THEREFOR

[75] Inventor: Claude Lambert, Laval, Canada

[73] Assignee: Data Radio Inc., Mount Royal, Canada

[21] Appl. No.: 892,926

[22] Filed: Jun. 3, 1992

[51] Int. Cl.[6] .................................................. H04L 27/10
[52] U.S. Cl. .......................... 375/223; 375/272; 375/303; 375/334
[58] Field of Search .......................... 375/53, 49, 8, 375/9, 51, 45, 23, 46, 88, 47, 52, 62, 67, 222, 223, 268, 269, 271, 273, 272, 274, 275, 322, 323, 329, 334, 335; 332/100, 103; 329/300, 304

[56] References Cited

U.S. PATENT DOCUMENTS

| | | | |
|---|---|---|---|
| 4,669,095 | 5/1987 | Hall | 375/90 |
| 4,700,364 | 10/1987 | Miyazaki et al. | 375/62 |
| 4,734,920 | 3/1988 | Betts | 375/8 |
| 4,748,640 | 5/1988 | Staley et al. | 375/65 |
| 4,780,889 | 10/1988 | Ley | 375/106 |
| 4,882,726 | 11/1989 | Lang | 370/24 |
| 4,894,847 | 1/1990 | Tjahjadi | 375/121 |
| 5,001,729 | 3/1991 | Tjahjadi | 375/106 |
| 5,038,365 | 8/1991 | Belloc | 375/8 |
| 5,103,463 | 4/1992 | Schoeneberg | 375/51 |
| 5,105,444 | 4/1992 | Gard | 375/49 |

OTHER PUBLICATIONS

'Component Data Book', Zilog Corporation, 1983–84 Edition, pp. 71–86.

*Primary Examiner*—Stephen Chin
*Assistant Examiner*—Kevin Kim
*Attorney, Agent, or Firm*—Ridout & Maybee

[57] ABSTRACT

A system for the transmission of data, and a modem for use in such a system, utilize variable shift keying (VSK), in which a data signal is modulated to form a continuous phase signal in which successive symbols are represented by successive signal segments of constant phase angle, typically 180° or one half cycle, different symbols being distinguished by the segments being of different duration, i.e. at different frequencies. The ratios of the frequencies may be chosen to facilitate signal modulation and demodulation, and to control the frequency spectrum of the transmitted signal. Each symbol may represent one or more bits of the data signal. The lengths of half cycles used to represent different symbols may be adjusted by introducing flat peaks into the half cycles whilst maintaining uniform the profile of their flanks so as to facilitate generation and reduce zero crossing detection jitter during reception.

11 Claims, 4 Drawing Sheets

DATA COMMUNICATION SYSTEM AND MODEM THEREFOR

FIELD OF THE INVENTION

This invention relates generally to the transmission and reception of digital data signals, and to a modulator/demodulator (MODEM), for utilization in a data communication system.

BACKGROUND OF THE INVENTION

Computers and a variety of other equipment normally generate digital signals in the form of switched currents or voltages. These signals have either one of two states, usually represented by voltage levels, which are used to indicate a data "1" or "0", respectively. Each such data element is called a binary digit or bit. For short distances, up to a few meters, these digital signals can be carried directly by means of wires from source to destination. However, the electrical characteristics of wires, particularly reactance and resistance, severely limit the rate at which the digital signals may be transmitted over longer distances.

Generally, a modulator is used to convert digital signals into a suitable analog form for long distance communication. A modulator performs this conversion by encoding the digital signals onto a carrier-signal. The modulated carrier-signal occupies a frequency band centred on the carrier-signal. The modulated-carrier signal is then transmitted over a suitable transmission medium. A demodulator acts as the receiver of the modulated carrier-signal and utilizes a demodulation process to extract the modulating signal, or the original data signal. In a bidirectional system, the modulator and demodulator at a station are conveniently combined into a MODEM.

In a communication system which utilizes a MODEM, the primary limitation of the signalling speed will be the bandwidth of the transmission medium. The bandwidth for a typical telephone line is 2700 Hz, extending from 300 Hz to 3000 Hz, and for a radio channel the bandwidth may be 4900 Hz, extending from 100 Hz to 5000 Hz.

An increase in signalling speed within a given bandwidth can be obtained by using schemes that encode two or more bits for each signalling element. For example, in a dibit encoding scheme, combinations of two bits are represented by four different states to be transmitted.

| STATE | 0  | 1  | 2  | 3  |
|-------|----|----|----|----|
| BITS  | 00 | 01 | 10 | 11 |

Each bit combination or state is called a symbol. Encoding two or more bits per symbol leads to an increase in the rate at which bits can be transmitted in a given bandwidth.

A variety of different modulation techniques have been developed to make effective use of the available bandwidth in any given situation. Each modulation technique involves varying one or more of the following three characteristics of a carrier signal: frequency (or, in other words, rate of change of phase angle), phase and amplitude. The following three basic encoding or modulating techniques are used to modulate digital data into an analog form: frequency shift keying (FSK), phase shift keying (PSK) and amplitude shift keying (ASK). Each technique exploits a different characteristic of the carrier-signal in order to convey information in the modulating signal. FSK uses different frequencies to represent different symbols in the modulating signal. The frequency of the modulating signal is varied to represent the information contained in the modulating signal. For convenience in generating symbols and associated timing signals, the frequencies chosen to represent each symbol are made multiples of one another. For example, one fast frequency shift keying (FFSK) technique uses one cycle of 1200 Hz to represent one symbol and one and a half cycles of 1800 Hz to represent another symbol. Each symbol or bit has the same duration. The maximum data rate is limited by the audio bandwidth; therefore, it is advantageous to use the lowest possible audible frequencies.

PSK uses two or more signals of different phase to represent different symbols. Each symbol has the same duration, although the phase of each different symbol differs. For example, in a two symbol system the bits "0" and "1" are distinguished by a 180° phase shift. Similarly, in a four symbol system each symbol is distinguished by means of a 90° phase shift; this is known as quadrature phase shift keying (QPSK).

ASK signals maintain a constant phase and frequency but utilize different amplitudes for each symbol. The carrier amplitude is varied in proportion to the modulating signal. As in each of the other techniques, each of the symbols has the same duration. The signalling rate is limited by the number of bits per symbol, which in turn is limited by the signal to noise ratio of the channel.

In addition to FSK, PSK and ASK, a number of modulation techniques have been developed which employ, either singly or in combination, the above techniques. For example, quadrature amplitude modulation (QAM) uses a combination of amplitude and phase shift keying. However, one feature common to all the modulation techniques discussed above is that all the symbols in the modulated carrier-signal have the same duration.

MODEMS may operate either synchronously or asynchronously. In synchronous operation, a common clock signal is utilized to synchronize the operation of MODEMS at opposite ends of a transmission path, whilst in asynchronous operation, unsynchronized timing references are utilized to demodulate received signals, based on the organization of transmitted data into relatively small frames such that once the beginning of a frame has been recognized, any phase shift of the local clock during decoding of the remainder of the frame will be insignificant; or the local clock can be phase-locked to the incoming signal. In either case, the necessity for a clock signal has been thought to dictate a constant symbol rate.

I have found that, not only is a constant symbol rate not essential to effective MODEM communications, but that the use of a variable symbol rate may have significant advantages under some circumstances.

SUMMARY OF THE INVENTION

The present invention relates to a data communication system or MODEM in which the duration of the symbols of the modulated carrier-signal are variable. Each different symbol is represented by an equal phase angle, usually 180° or one half cycle, of a distinct frequency. Each symbol is continuous in phase, e.g. each successive half cycle always has an opposite polarity and each successive half cycle is continuous in phase with its predecessor. The applicants have named this technique "variable shift keying" (VSK) due to the variation in the length of each symbol of the modulated-carrier signal. The present invention is capable of providing a data communication system with baud rates comparable to that of other high speed modulation techniques in current use. Demodulation is achieved by determining the duration of successive half cycles or other phase angle increments of the received signal in order to decide which modulation state each represents.

The present invention does not require that the frequencies be chosen according to the bit rate; rather, they may have any value compatible with the available bandwidth. The frequencies may also be in any ratio to each other. However, smaller ratios, which reduce bandwidth and allow higher bit rates, are more difficult to decode and more subject to phase errors in the transmission medium. The flexibility in frequency selection allows VSK to be tailored to co-exist with a variety of other in-band signalling systems. In addition, the spectrum width and content of the modulated carrier-signal can be adjusted for compatibility with low frequency tones and other forms of signalling.

The present invention produces a modulated carrier signal which is typically not as unpleasant to the ear as presently used modulated carrier signals. Accordingly, VSK is particularly suited for use in communication systems in which voice and data signals share the same channel and the receivers are not muted during data transmission.

Due to the fact that the modulated signal is continuous in phase, e.g. each successive half cycle of the modulated carrier-signal has opposite polarity, the signal has an inherent tendency to balance, and the direct-current component in the signal is thereby minimized.

BRIEF DESCRIPTION OF THE DRAWINGS

These and further features of the invention described further with reference to the accompanying drawings, in which.

DESCRIPTION OF THE PREFERRED EMBODIMENTS

Figure 1:
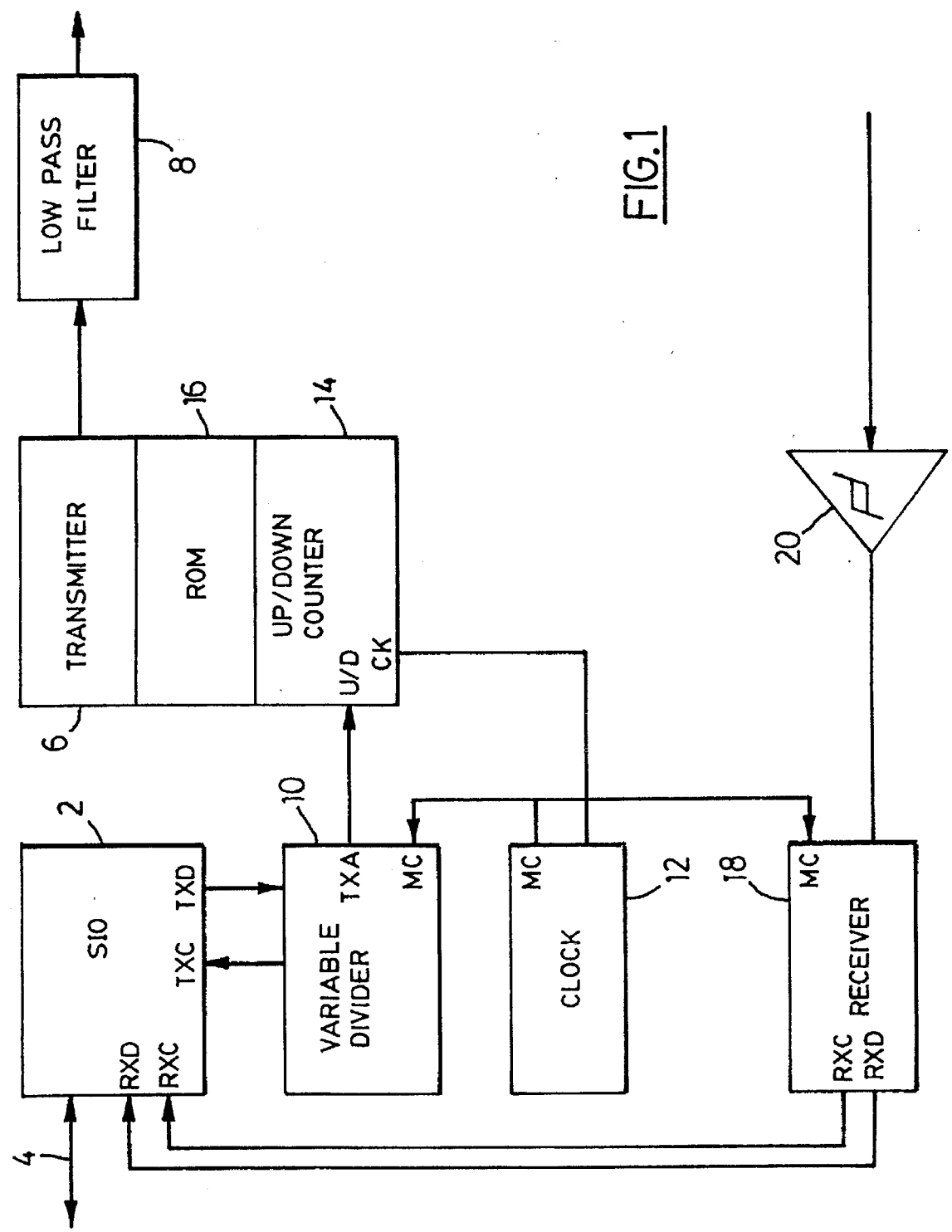
FIG. 1 is a block schematic diagram of a first embodiment of the invention.

Referring first to FIG. 1, an exemplary embodiment of a MODEM in accordance with the invention is based upon use of an SIO (Serial Input/Output) chip 2, for example one of the 8440 series SIO chips available from Zilog and other manufacturers. This chip provides two channels for parallel-to-serial conversion and serial-to-parallel conversion of data, according to number of different synchronous and asynchronous serial formats selectable by suitable programming of the chip, as described in detail in the manufacturer's data sheets relating to the chip, for example the Zilog Component Data Book. Each channel of the chip is also programmable as to the clock division ratio utilized, but for reasons that will become apparent, this ratio is selected to be unity. The serial data format may be chosen to suit the application and does not affect the implementation of the invention. Apart from various control addressing and power supply connections (not shown) which are conventional and do not form part of the invention, the chip has connections to an eight bit parallel data input/output bus 4, a transmitter clock input TXC, a serial data transmit output TXD, a receiver clock input RXC, and a serial data receive input RXD. Additional handshaking lines (not shown) are provided which may be utilized and programmed as required and form no part of the invention. Other devices having similar capabilities may be utilised; for example, if no synchronous communication capabilities are required, the same manufacturers DART device may be used, as well as a range of other serial communication controllers sold under a range of acronyms, provided that they have independent receive and transmit clock inputs which are edge triggered.

In common with conventional MODEMS, the output TXD controls a transmitter 6 which converts it into a suitable analog waveform which is applied to a data transmission line through a low pass filter 8. Unlike a conventional MODEM, a feedback circuit from the outport TXD controls a variable divider 10 between a clock generator 12 and the input TXC, thus providing variable shift keying (VSK) of the transmitted data, as well as an output TXA controlling the transmitter, thus shifting the modulation function from the transmitter 6 to the SIO 2.

Figure 2:
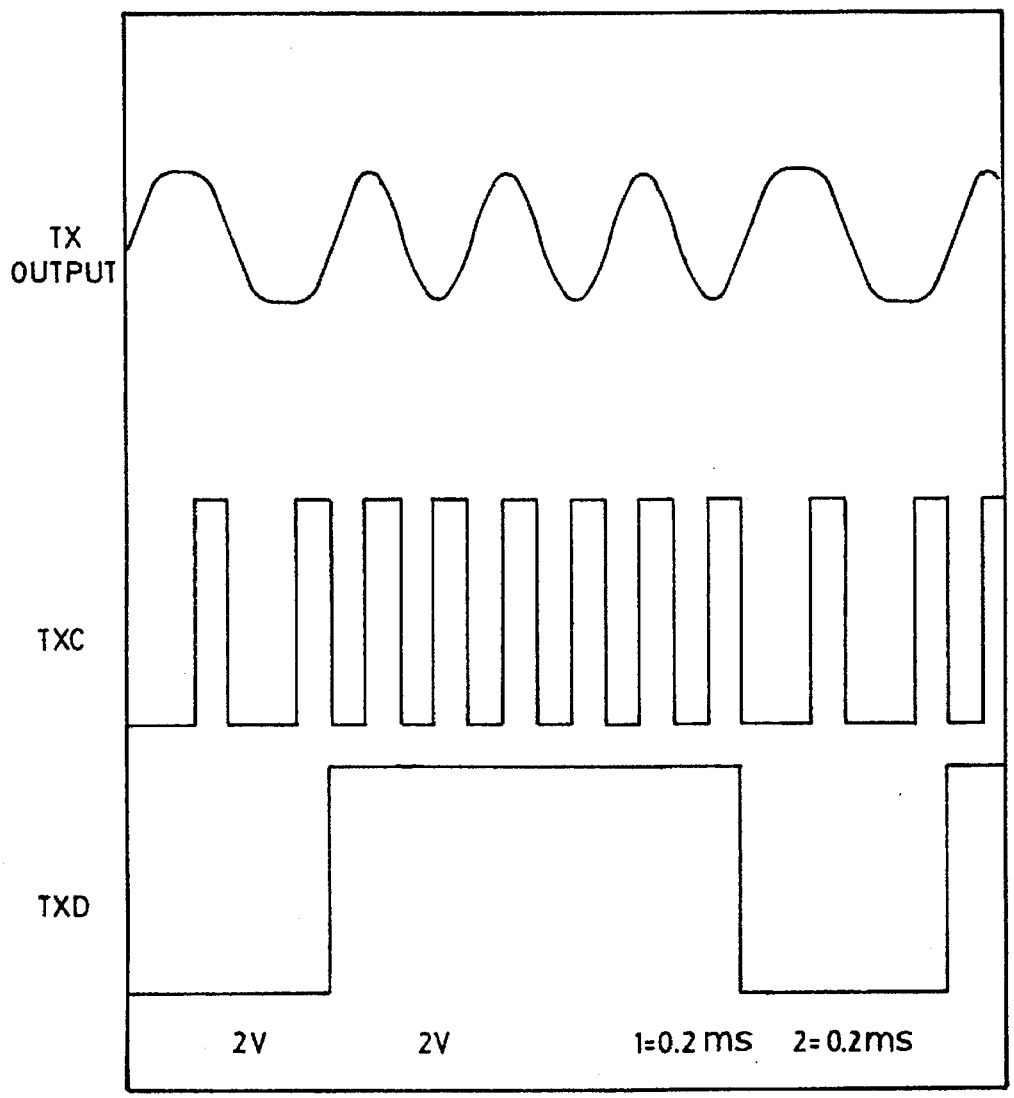
FIG. 2 represents the timing of exemplary waveforms present at certain points in FIG. 1.

A further output from the clock signal generator 12 is utilized in this exemplary embodiment to address, by means of an address counter 14, a read only memory 16, successive outputs of which are samples forming a TX output waveform (see FIG. 2) generated by the transmitter 6.

In the first exemplary embodiment described with reference to FIG. 1, it is assumed that one bit of data is to be transmitted per symbol, so that baud and bit rates are the same. Each symbol is transmitted as one half cycle of one of two frequencies, a first frequency representing a logical one and a second frequency representing a logical zero. A rate of 3:2 is utilized between the frequencies, which provides good results and is easily implemented. Other ratios may however be used. Smaller ratios permit some reduction in bandwidth, but signal to noise performance and immunity to phase distortion are impaired by increasing difficulty in distinguishing logical ones and zeros. Larger ratios are increasingly wasteful of bandwidth.

It is assumed for the purposes of description that the higher of the two frequencies is utilized to represent logical ones, but this arrangement may of course be reversed. Exemplary frequencies which may be used are 3200 Hz and 2133 Hz. A master clock signal at twice the higher (and three times the lower) frequency is utilized in the modulation and demodulation process: conveniently the clock generator 12 operates at a higher frequency (typically thirty two or sixty four times higher) so that it may provide a count signal to the up/down counter 14 which addresses the waveform memory 16, and has an output divided down to the master clock signal frequency for application to the variable divider 10 and to a receiver 18. The variable divider 10 divides by two or by three, according to the state of the output TXD (see FIG. 2). The SIO 2 outputs data signals responsive to each falling edge of the clock signal TXC (see FIG. 2) it receives from the divider 10. As long as TXD remains high, divider 10 operates as a divide-by-two counter, but when TXD goes low, divider 10 requires an additional master clock cycle from the clock generator 12 to complete a count cycle and thus acts as a divide-by-three counter. Additionally, the divider 10 provides the further output TXA at half the frequency of signal TXC which is applied to an up/down control input of the counter 14 such that it provides an upward or downward series of addresses to the waveform memory 16, causing the latter to output to the transmitter a complementary peak-to-peak series of waveform samples following each negative transition of the TXC signal. Since the clock rate of the counter 14 remains constant and thus the period to output a peak-to-peak series of samples remains constant, the waveform generated at the lower frequency will be flat-peaked between successive waveform sample series (see TX output, FIG. 2). This makes little difference to the in-band frequency spectrum of the signals generated, and since it equalizes the slope of the signal (see FIG. 2) transitions for the two frequencies, it provides some reduction in jitter during detection of zero crossings of a received signal. The generation and use of more precisely sinusoidal signals is however also within the scope of the invention, as is the use of alternative methods for generating the signals for transmission in the transmitter 6. Effectively, each symbol is represented by an equal phase angle (180°) of the generated signal, even though, with flat-peaked signals, the phase velocity may not be constant. The mean phase velocity of each symbol will however equal the frequency used to represent that signal.

Received signals are amplified and detected by a signal preprocessor schematised as a Schmidt trigger 20, with a degree of built-in hysteresis, which acts as a zero-crossing detector and applies an output signal having a transition for each zero-crossing of the received signal to the receiver 18. The function of the receiver 18 is (a) to determine whether the interval between each successive pair of zero crossings corresponds to an average phase velocity corresponding to the higher or lower frequency, (b) to assign an appropriate logic level to a corresponding portion of the output signal, (c) to provide a data signal for application to data input RXD of SIO 2, and (d) to reconstitute a signal corresponding to the signal TXC used to generate the signal, for application to the clock input RXC of the SIO 2. In fact, the received signal, after squaring by the Schmidt trigger 20, is an approximation to the signal TXA used to control the transmitter 6, subject to transmission line phase distortions and phase detection jitter, and therefore in a very simple embodiment, transitions of this signal could be used to regenerate the signal RXD, and a simple timer circuit used to determine whether the time lapse between successive zero crossings is greater or less than a threshold intermediate between the periods of one half cycle of the two modulating frequencies. As long as the time lapse threshold is not reached, logical ones are being received, and vice-versa.

Figure 4:
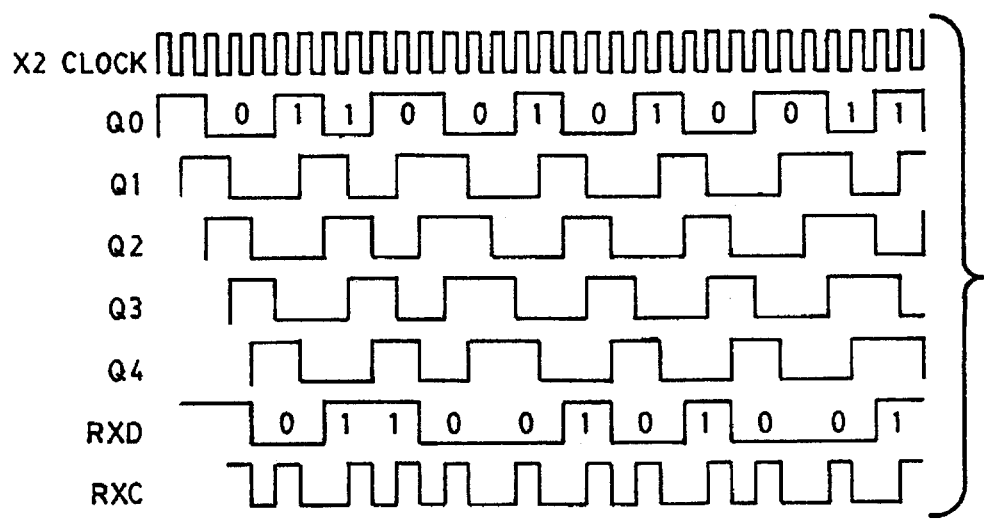
FIG. 4 represents the timing of exemplary waveforms present at certain points in FIG. 3.
Figure 3:
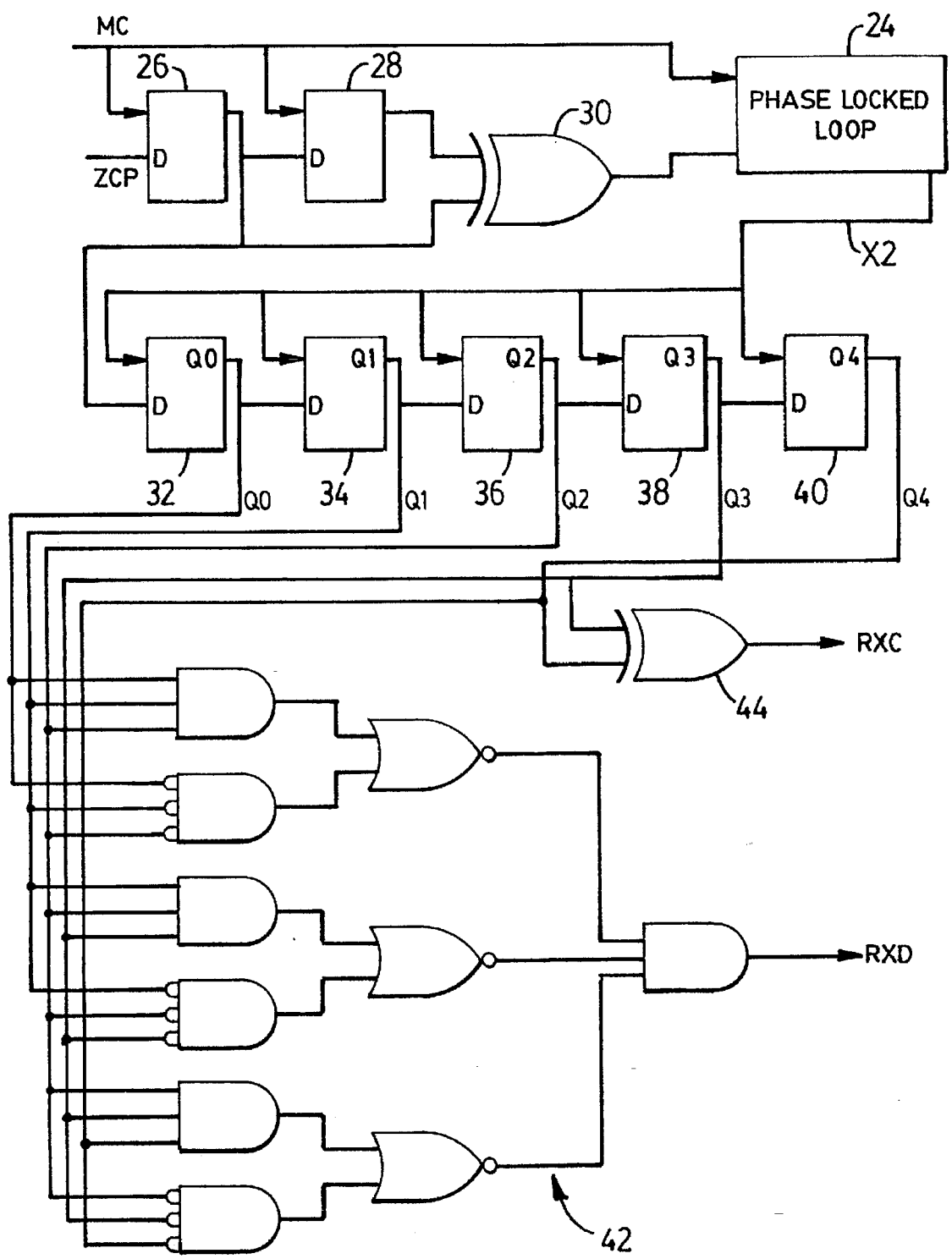
FIG. 3 is a block schematic diagram of the block labelled RECEIVER in FIG. 1.

In practice, an arrangement having greater noise immunity is preferred, an exemplary receiver being shown in FIG. 3. The receiver receives signals from preprocessor 20 and master clock pulses MC from clock generator 12, and generates clock and data signals RXC and RXD. The master clock pulses are applied to a phase locked loop 24, and to two D-type flip-flops 26 and 28, the output of flip-flop 26 being applied to the input of flip-flop 28 as well as to an exclusive OR gate 30 which also receives the output of flip-flop 28. This circuit acts firstly to delay transitions of the incoming signal at the output of flip-flop 26 to the next positive transition of the signal MC, thus eliminating temporal jitter. It also detects each transition of the delayed incoming signal. These transitions, appearing at the output of the gate 30, are used to control the phase locked loop 24 so that it provides a reconstituted master clock signal X2 at its output which is phase locked to the master clock of the source of the received signals. This clock signal X2 is used to clock a further series of D-type flip-flops 32, 34, 36, 38 and 40, connected as a five-stage shift register, which receive the output from flip-flop 26, and successively delay it by cycles of the reconstituted clock X2, as shown in the first six lines of FIG. 4. The outputs Q0, Q1, Q2, Q3 and Q4 of the flip-flops 32, 34, 36, 38 and 40 are applied to a decoder 42 to provide the reconstituted data signal RXD, whilst a further exclusive-OR gate 44 performs a similar function to the gate 30 upon the outputs Q3 and Q4 to produce a reconstituted phase-locked clock signal RXC. These signals are applied to the SIO, which reconverts the received serial signal in parallel data in accordance with the mode in which it has been programmed.

The foregoing example uses a single-bit encoding scheme. Using the frequencies exemplified, 3200 Hz and 2133 Hz, and using one half cycle to represent a bit, the data rates achieved are 6400 bits/second for logical ones and 4167 bits/second for logical zeros. Assuming an equal proportion of logical ones and zeros, this provides an average transmission rate of 5120 bits per second. Since the half cycles of the transmitted signal always alternate to ensure phase continuity, balanced modulation is achieved with little DC component in the transmitted signal, which improves compatibility with radio and telephone systems having poor low frequency response, as well as systems using low frequency sub-sonic signalling tones. The frequency spectrum of the output signal can to an extent be tailored by selection of the modulation frequency, and it is a useful characteristic of the signal that it can be made much more pleasant sounding than typical MODEM input. This is an advantage when a channel is to be shared with signals intended for human listening.

As in other modulation systems, data rates can be improved by using multi-bit encoding schemes. An example of how the MODEM already described can be modified to accommodate a dibit encoding scheme will be described with reference to FIGS. 5 and 6. The circuit shown in FIG. 5 replaces the variable divider 10 of FIG. 1. For dibit coding, four different states may appear in the output. signal, corresponding in the present invention to half cycles of four different frequencies, representing pairs of bits having logical states 00, 01, 10 and 11. In the present example, the frequencies are chosen to be in the ratios 2:3:4:5, representing the above bit pairs, although other ratios and arrangements are of course possible as previously discussed.

Figure 5:
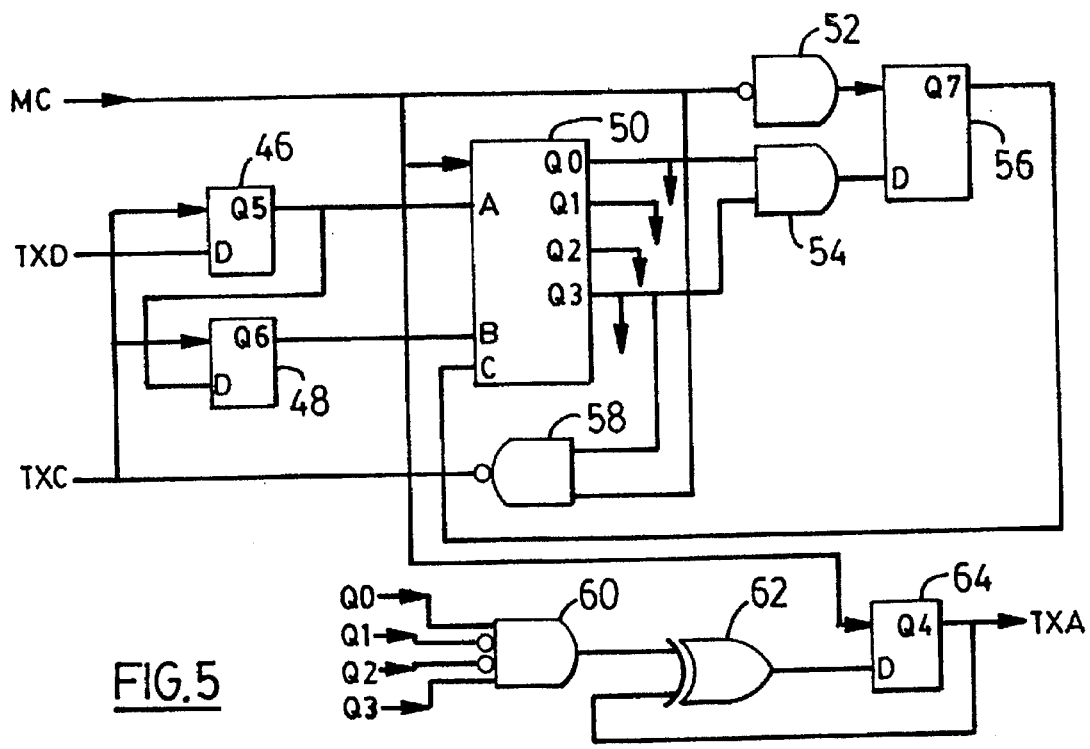
FIG. 5 is a block schematic diagram of an alternative embodiment of the block VARIABLE DIVIDER of FIG. 1, as utilized in a second embodiment of the invention.

In FIG. 5, a programmable four bit counter 50 is configured to have a maximum count of 10, the starting point of the count being presettable, in this instance by suitable selection of control inputs A, B & C. Input C when active programs the count according to the state of inputs A and B (See FIG. 6). If A and B are both high, the starting point of the count is preset to 6, if A is low the starting point is preset to 4, if B is low the starting point is preset to 2, and if A and B are both low, the starting point is zero. The counter is clocked by the master clock MC, and this clock signal, inverted by a gate 52, together with a signal from a gate 54 detecting a count of nine (outputs Q0 and Q3; see FIG. 6) at the output of the counter 50, provide clock and data signals to a D-type flip-flop 56 which generates the counter presetting signal as a count of ten is reached. The eighth and ninth pulses are also detected by a gate 58 which receives the high bit output Q3 from the counter together with the eighth and ninth clock pulses to provide a double pulse transmitter clock TXC. The extreme asymmetry of the clock TXC is immaterial, since the SIO reacts only to its positive-going transitions to present data bits at its output TXD. The waveforms on lines MC, and at the outputs Q0, Q1, Q2 and Q3 of counter 50 are shown in FIG. 6.

Figure 6:
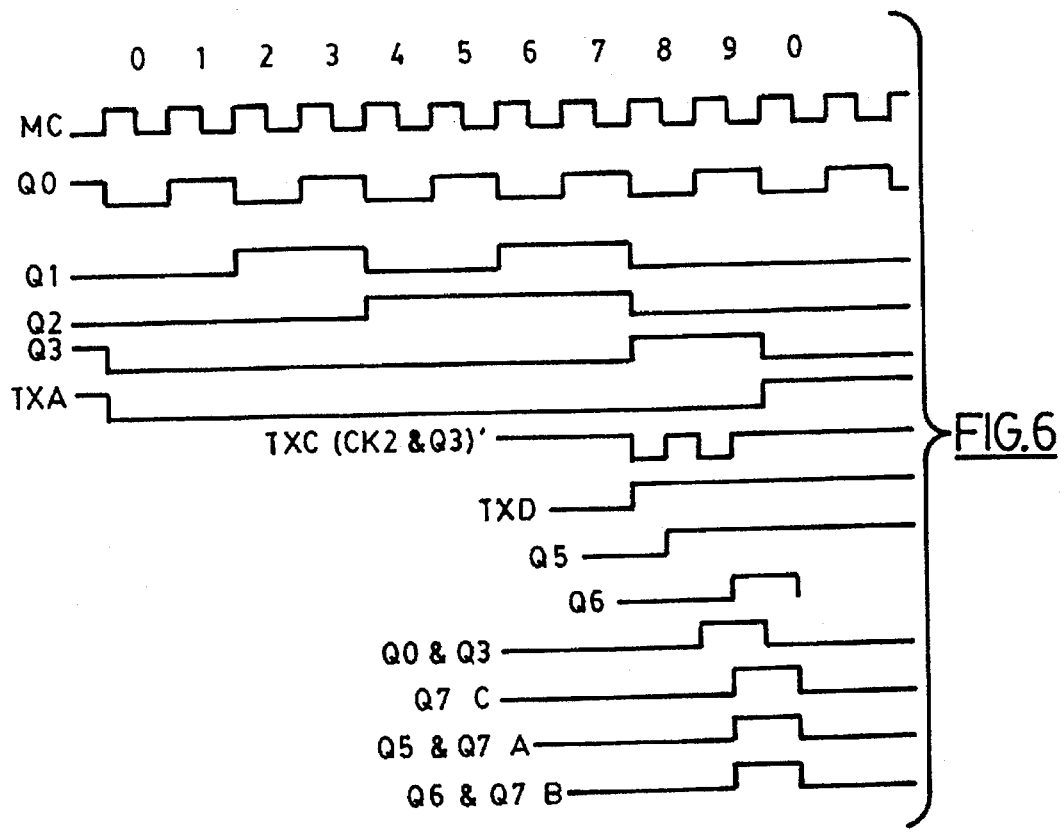
FIG. 6 represents the timing of exemplary waveforms present at certain points in FIG. 5.

Each double pulse appearing on the line TXC (see FIG. 6) loads a two stage shift register, formed by D-type flip-flops 46 and 48, from the corresponding output bits appearing at the TXD output of the SIO 2 (see FIG. 6), the values of these bits as latched by the flip-flops determining the logic states present on inputs A and B of the counter 50 and thus the length of its count (see lines Q5 and Q6 in FIG. 6).

The appearance of a count of nine at the counter outputs is also detected by a gate 60, whose output is applied to an exclusive-OR gate 62 together with the output of a D-type flip-flop 64 into which the output of gate 62 is latched at each master clock pulse MC. The effect of this circuit is that the output TXA (see FIG. 6) from the flip-flop 64 changes state each time the counter 50 reaches its full count, thus providing an output suitable for driving the transmitter 6.

The receiver may be constructed on similar lines to that shown in FIG. 3, except that more stages will be required in the shift register, and the decoding of both the symbols and the clock signals will be correspondingly more complex, in order to identify the four possible symbol intervals and regenerate the associated dibits, and to generate the double clock pulse required to clock in each regenerated dibit.

Assuming a master clock (MC) frequency of 9600 Hz, the frequencies representing the various dibits will be as follows: 00—1280 Hz; 01—1600 Hz; 10—2133 Hz; and 11—3200 Hz. Assuming uniform dibit distribution, the average bit rate is 7314 bits/second which is 43% greater than with the single bit example considered above. Techniques using more than two bits per symbol may be utilized, but since the improvement in bit rate is not proportional to the number of bits encoded per symbol, the added complexity may soon limit the number of bits that can advantageously be encoded per symbol.

The examples described have been based upon the use of one half cycle at each frequency to represent a symbol in the modulated signal. There is no theoretical reason why a fixed integral number of half cycles could not be used to represent a symbol, but in general there will be no advantage in such a modification which will merely substantially decrease the symbol and rate bit rates without a proportionate improvement in noise immunity. More broadly, the length of each symbol need not be a half cycle or an integral number of half cycles provided that each symbol is represented by the same phase angle, and the average phase velocity is equal to the desired frequency. Half cycles are however easy to generate and to detect, and the additional complexity and possibly reduced noise immunity associated with any alternative phase angle interval could prove difficult to justify in terms of improved throughput.

I claim:

1. A modem comprising:
(a) means to present data to be transmitted as a series of symbols selected from a small finite number of symbol types;
(b) means for receiving said series of symbols and generating a continuous alternating output signal for application to a transmission link with each successive symbol represented by an equal 180° phase angle of said alternating output signal but having a mean phase velocity unique to the symbol type to which the symbol belongs;
(c) means for receiving a continuous alternating input signal from the transmission link and dividing it into successive portions of equal phase angle;
(d) means for determining the mean phase velocity of said successive portions to identify symbols represented thereby; and
(e) means to present said symbols as received data; wherein the means for generating the output signal comprises a circuit translating a series of symbols into a series of immediately successive time intervals for durations of which intervals differ to represent symbols of different types and a waveform generator generating a signal in response to commencement of each interval so defined, the signal including a peak-to-peak half cycle of a waveform having a half cycle period which is constant and no longer than any of said intervals, said signal having a phase velocity that is zero between generation of successive half cycles of the waveform, whereby the signal during each interval has a mean phase velocity which is different according to the duration of that interval, the signals generated by the waveform generator providing the continuous alternating output signal.

2. A data transmission system comprising:
(a) means to present data to be transmitted as a series of symbols selected from a small finite number of symbols types;
(b) means for receiving said series of symbols and generating a continuous alternating output signal for application to a transmission link with each successive symbol represented by an equal 180° of said alternating output signal but having a mean phase velocity unique to the symbol type to which the symbol belongs;
(c) means for receiving said continuous alternating output signal from the transmission link and dividing it into successive portions of equal phase angle;
(d) means for determining the mean phase velocity of said successive portions to identify symbols represented thereby; and
means to present said symbols as received data;
wherein the means for generating the output signal comprises a circuit translating a series of symbols into a series of immediately successively time intervals, the duration of which intervals differ to represent symbols of different types, and a waveform generator generating a signal in response to commencement of each interval so defined, the signal including a peak-to-peak half cycle of a waveform having a half cycle period which is constant and no longer than any of said intervals, said signal having a phase velocity that is zero between generation of successive half cycles of the waveform, whereby the signal during each interval has a mean phase velocity which is different according to the duration of that interval, the signals generated by the waveform generator during said series of immediately successive time intervals providing the continuous alternating output signal.

3. A system according to claim 2, wherein the number of symbol types is two.

4. A system according to claim 2, wherein the number of symbol types is four.

5. A system according to claim 2, wherein the velocity determining means determine the mean phase velocity of a symbol by determining its duration.

6. A data modem comprising a serial communications controller providing parallel-to-serial and serial-to-parallel conversion of data signals under the control of independent transmitter and receiver clock signal inputs, a transmitter generating a modulated output signal under control of a serial data output of said controller, and a receiver converting a modulated input signal into a serial data input to said controller, wherein a clock generator applies a clock signal to a variable divider having a division ratio controlled by said serial data output, the divider being configured to recognize different symbols at said serial data output and to count a different period before applying a transmitter clock signal to said transmitter clock input to clock a following symbol out of said serial data output, depending upon the symbol recognized, wherein said variable divider controls the generation of successive half cycles of a continuous waveform in said transmitter, the duration of successive half cycles being equal to the successive periods counted by said divider, and wherein said receiver includes means to determine the duration of successive half cycles of the incoming signal and associate them with different symbols according to their length, and means to reconstitute for each symbol clock signals corresponding to those applied to the transmitter clock input in association with similar symbols, said symbols and said clock signals being applied to a receiver data input and the receiver clock input of the controller for regeneration of a parallel data signal.

7. A data modem according to claim 6, wherein each symbol represents one bit, and the division ratio of the variable divider is switchable between two values according to whether the bit is a logical one or a logical zero.

8. A data modem according to claim 7, wherein the two values of the division ratio are in the ratio 3:2.

9. A data modem according to claim 6, wherein each symbol represents two bits, the division ratio of the variable divider is switchable between four values according to the last two bits appearing at the transmitter data output of the controller, and the variable divider applies two pulses to the transmitter clock input for each symbol period counted by it.

10. A data modem according to claim 6, including means to detect zero crossings of the received signal, a phase locked loop receiving a master clock signal and said zero crossings and generating a clock signal phase locked to said zero crossings, a shift register receiving said incoming signal and clocked by said phase locked clock signal, and decoding circuits receiving signals from stages of said shift register to generate said receiver data input and said receiver clock signal.

11. A data modem according to claim 6, wherein the transmitter includes a read-only memory from which the transmitter receives a peak-to-peak sequence of waveform samples in response to receipt by the memory of an address sequence, and an up/down counter which generates address sequences for the read-only memory, the counter receiving both a direction signal from the variable divider which changes state for each transmitter clock pulse and determines count direction during each successive sequence, and a constant rate clock signal from the clock generator, successive peak-to-peak sequences commencing at times determined by said transmitter clock signal.

* * * * *